US010648714B2

(12) United States Patent
Van Gysel

(10) Patent No.: US 10,648,714 B2
(45) Date of Patent: May 12, 2020

(54) HEAT PUMP SYSTEM USING LATENT HEAT

(71) Applicant: VGE BVBA, Antwerp (BE)

(72) Inventor: Carl Van Gysel, Koksijde (BE)

(73) Assignee: VGE BVBA, Antwerp (BE)

( * ) Notice: Subject to any disclaimer, the term of this patent is extended or adjusted under 35 U.S.C. 154(b) by 435 days.

(21) Appl. No.: 14/388,207

(22) PCT Filed: Mar. 27, 2013

(86) PCT No.: PCT/EP2013/056599
§ 371 (c)(1),
(2) Date: Sep. 25, 2014

(87) PCT Pub. No.: WO2013/144248
PCT Pub. Date: Oct. 3, 2013

(65) Prior Publication Data
US 2015/0114019 A1  Apr. 30, 2015

(30) Foreign Application Priority Data

Mar. 28, 2012  (EP) .................................... 12161843

(51) Int. Cl.
F25B 30/06  (2006.01)
F24D 17/02  (2006.01)
(Continued)

(52) U.S. Cl.
CPC ............... *F25B 30/06* (2013.01); *F24D 3/18* (2013.01); *F24D 10/00* (2013.01); *F24D 17/001* (2013.01); *F24D 17/02* (2013.01); *F24D 19/00* (2013.01); *F24D 19/0095* (2013.01); *F25B 25/005* (2013.01); *F25B 30/02* (2013.01); *F25C 1/14* (2013.01); *F28D 20/02* (2013.01); *F28D 20/021* (2013.01); *F28F 19/008* (2013.01);
(Continued)

(58) Field of Classification Search
CPC ............ F25C 2301/00; F25C 2301/002; F24D 10/003; F24D 3/18; F24D 19/0095; F24D 2200/11; F24D 2200/12; F24D 2200/13; F24D 2200/20; F24D 2200/24; F25B 30/06; F25B 25/005; Y02B 30/12
See application file for complete search history.

(56) References Cited

U.S. PATENT DOCUMENTS 3,656,315 A * 4/1972 Ganiaris .................... A23F 5/30
                                                            426/385
4,003,213 A * 1/1977 Cox ......................... B01D 9/04
                                                             62/124
(Continued)

FOREIGN PATENT DOCUMENTS

DE  440 599    2/1927
DE  29 52 541  7/1981
(Continued)

*Primary Examiner* — Nelson J Nieves
(74) *Attorney, Agent, or Firm* — Levy & Grandinetti

(57) ABSTRACT

A heat pump system is disclosed comprising a heat-exchanger extracting latent heat from liquid stored in a reservoir, thereby forming an ice slurry. The heat pump also includes a device for delivering the heat to a heat consumer. The heat pump system includes a random input of extrinsic liquid into the reservoir and a device for removing ice slurry stored in the reservoir outward the system.

14 Claims, 5 Drawing Sheets

(51) Int. Cl.
*F25B 30/02* (2006.01)
*F24D 19/00* (2006.01)
*F24D 3/18* (2006.01)
*F28D 20/02* (2006.01)
*F24D 17/00* (2006.01)
*F28F 19/00* (2006.01)
*F25B 25/00* (2006.01)
*F24D 10/00* (2006.01)
*F25B 7/00* (2006.01)
*F25B 29/00* (2006.01)
*F25C 1/14* (2018.01)

(52) U.S. Cl.
CPC ...... *F24D 2200/11* (2013.01); *F24D 2200/12* (2013.01); *F24D 2200/13* (2013.01); *F24D 2200/20* (2013.01); *F24D 2200/24* (2013.01); *F24D 2200/32* (2013.01); *F25B 7/00* (2013.01); *F25B 29/003* (2013.01); *F25B 2339/047* (2013.01); *F25C 2301/002* (2013.01); *Y02B 10/40* (2013.01); *Y02B 10/70* (2013.01); *Y02B 30/12* (2013.01); *Y02B 30/17* (2018.05); *Y02B 30/18* (2013.01); *Y02B 30/52* (2013.01); *Y02E 60/145* (2013.01); *Y02P 60/855* (2015.11)

(56) References Cited

U.S. PATENT DOCUMENTS

| | | | | |
|---|---|---|---|---|
| 4,253,309 | A * | 3/1981 | Abrahamsson | F24D 11/0221 62/235.1 |
| 4,480,445 | A * | 11/1984 | Goldstein | F24D 11/02 62/123 |
| 4,551,159 | A | 11/1985 | Goldstein | |
| 4,671,077 | A * | 6/1987 | Paradis | C02F 1/22 62/324.1 |
| 4,970,869 | A * | 11/1990 | Igarashi | F25C 1/00 62/330 |
| 5,174,859 | A * | 12/1992 | Rittof | C02F 1/22 159/DIG. 5 |
| 5,207,075 | A * | 5/1993 | Gundlach | F24F 5/0017 237/2 B |
| 6,180,843 | B1 * | 1/2001 | Heinemann | F17C 11/00 585/15 |
| 6,681,593 | B1 | 1/2004 | Gundlach | |
| 6,904,976 | B1 | 6/2005 | Zach et al. | |
| 7,152,413 | B1 * | 12/2006 | Anderson | F24F 5/0017 62/118 |
| 2002/0189277 | A1 * | 12/2002 | Takao | B67D 1/0012 62/393 |
| 2004/0261438 | A1 * | 12/2004 | Clulow | F25C 3/04 62/235 |
| 2005/0188710 | A1 * | 9/2005 | Dilk | F25B 9/002 62/235 |
| 2009/0288430 | A1 * | 11/2009 | Anderson | F25B 13/00 62/79 |
| 2010/0263400 | A1 * | 10/2010 | Tachibana | B01D 61/025 62/389 |
| 2012/0067047 | A1 * | 3/2012 | Peterson | C02F 1/22 60/651 |
| 2012/0279681 | A1 * | 11/2012 | Vaughan | F24D 10/003 165/62 |

FOREIGN PATENT DOCUMENTS

| | | | |
|---|---|---|---|
| DE | 31 45 204 | 7/1982 | |
| DE | 101 14 257 | 9/2002 | |
| DE | 20 2004 006 853 | 9/2004 | |
| DE | 10 2010 006 882 | 8/2011 | |
| EP | 0283528 A1 * | 9/1988 | ............... C02F 1/22 |
| EP | 1 807 672 | 5/2006 | |
| FR | 883453 | 7/1943 | |
| WO | WO 2008/146274 | 12/2008 | |
| WO | WO 2009/123458 | 10/2009 | |
| WO | WO 2010/034661 | 4/2010 | |
| WO | WO2010145040 A1 * | 12/2010 | ............... F25B 30/00 |

* cited by examiner

HEAT PUMP SYSTEM USING LATENT HEAT

This Application is the U.S. National Phase of International Application Number PCT/EP2013/056599 filed on Mar. 27, 2013, which claims priority to European Patent Application Number 12161843.3 filed on Mar. 28, 2012.

FIELD OF THE INVENTION

The present invention relates to a heat pump system comprising an heat-exchanger extracting latent heat from liquid stored in a reservoir and means for delivering said heat to a heat consumer.

BACKGROUND OF THE INVENTION

Heat pumps have the ability to move thermal energy from one environment to another. In general, heat pumps work as follows: the refrigerant, in its gaseous state, is pressurized and circulated through the system by a compressor. On the discharge side of the compressor, the now hot and highly pressurized vapor is cooled in a heat exchanger (preferably a condenser) until it condenses into a high pressure, moderate temperature liquid. The condensed refrigerant then passes through a pressure-lowering device such as an expansion valve. The low pressure, liquid refrigerant leaving the expansion valve enters another heat exchanger (preferably an evaporator), in which the fluid absorbs heat and boils. The refrigerant then returns to the compressor and the cycle is repeated. The evaporator extracts heat from a heat source and the condenser supplies heat to a heat consumer.

In case of geothermal heat pumps, the heat of the ground, groundwater or surface water is used as heat source for in most cases heating buildings. The thermal recharge of the heat source rely on the migration of heat from the surrounding geology and the seasonal temperature cycles at ground level. Two common types can be distinguished, namely open loop systems and closed loop systems.

In an open loop system the natural water from a well (groundwater or surface water) is pumped into an heat-exchanger of the heat pump circuit containing a refrigerant. The specific heat of the water is extracted and the cooled water is returned to a separate injection well, irrigation trench or body of water. The supply and return lines must be placed at sufficient distance from each other to ensure thermal recharge of the water heat source.

A disadvantage of the above open loop system is that, whereas extraction of latent heat would increase the output of the heat source, only specific heat can be extracted. One of the reasons is that ice formed by extraction of latent heat is very difficult being pumped again into the separate injection well, irrigation trench or body of water.

Another disadvantage of open loop systems is the size of the installation because of the high volume of circulating water required and the distance between the supply and return lines.

Further, another disadvantage is that open loop heat pump systems depend on the local legislation with regards of the use of ground and surface waters.

In a closed loop system the heat pump circulates a liquid or a refrigerant through the closed loop tubing in the underground or in a water reservoir to exchange heat.

Although latent heat of the water in the ground can be extracted, a severe limitation however is that the heat flux in the underground is predominantly limited by the thermal conductivity of the ground and the formation of ice-layers sticking around the tubing of the loop.

Another disadvantage of closed loop systems is the size of the ground heat exchangers and the size of the water reservoir because of the required amount of heat stored in the underground or in the water reservoir to supply sufficient heat during the winter period. An example thereof is described in DE440599. The size of the water reservoir is an important restriction to apply the technology in densely populated areas.

In an attempt to enhance the ice melting again thereby reducing the required size of the reservoir, additional heat sources such as solar panels can be added as described in patent EP1807672, which makes recharging the reservoir more complex and expensive.

Another example of ice melting in a closed loop system is described in U.S. Pat. No. 6,681,593, using a shallow pool with heat extractors for extracting latent heat and bristle brush conveyors for removing floating pieces of ice from the pool into the reservoir. Obviously, such system is complex, expensive and the shallow pool occupies additional surface area.

Further, another disadvantage of a closed loop heat pump system is that per definition external waters containing waste heat energy such as domestic waste water cannot be used as heat source to supply latent heat instead of specific heat.

Reference can be made to following patents, DE 2952541 A1, DE10114257 A1, DE 102010006882 A1, DE 202004006853 U1, EP1807672, U.S. Pat. No. 6,904,976 B2, WO2009123458 A1 encountering the disadvantages mentioned above.

Therefore, it is an object of the present invention to provide a heat pump system delivering equal or improved performance compared to known heat pump systems with smaller heat source reservoirs compared to the current heat pump systems.

It is also an object of the present invention to provide a heat pump system having suitable characteristics for use in urbanized areas in particular in areas suffering from lack of building space.

Another object of the present invention is to provide a heat pump system less suffering from heat flux limitation due to ice formation.

Another object of the present invention is to provide a heat pump system allowing less complex and expensive recharge of the heat source, in particular allowing recharging during warm seasons.

Further, another object of the present invention is a heat pump system allowing use of rain water as well as waste heat energy in waste liquids as a heat source, in particular domestic waste water.

In addition, it is an object of the present invention to provide a heat pump system being less independent on the local legislation with regards of the use of ground and surface waters.

In addition, it is an object of the present invention is to provide a heat pump system allowing generation of heat during electrical off-peak hours.

The present invention addressed the above objects by proposing a heat pump system comprising an heat-exchanger extracting latent heat from liquid stored in a reservoir, thereby forming ice slurry, and means for delivering said heat to a heat consumer, characterized in that the heat pump system comprises random input of extrinsic liquid into the reservoir and means removing ice slurry outward the system.

SUMMARY OF THE INVENTION

The present invention is directed to a heat pump system comprising an heat-exchanger extracting latent heat from liquid stored in a reservoir, thereby forming ice slurry, and means for delivering said heat to a heat consumer, characterized in that the heat pump system comprises random input of extrinsic liquid into the reservoir and means for removing ice slurry storing in the reservoir outward the system. Extrinsic liquid is defined as liquid originating from one or more sources external to the system and not from a recirculation loop wherein liquid originating from said removed ice slurry is recycled to the reservoir. Random input is understood as a supply on regular or irregular, —depending on availability of the extrinsic liquid—, moments in time of any kind of extrinsic liquid.

DESCRIPTION OF THE INVENTION

Figure 1:
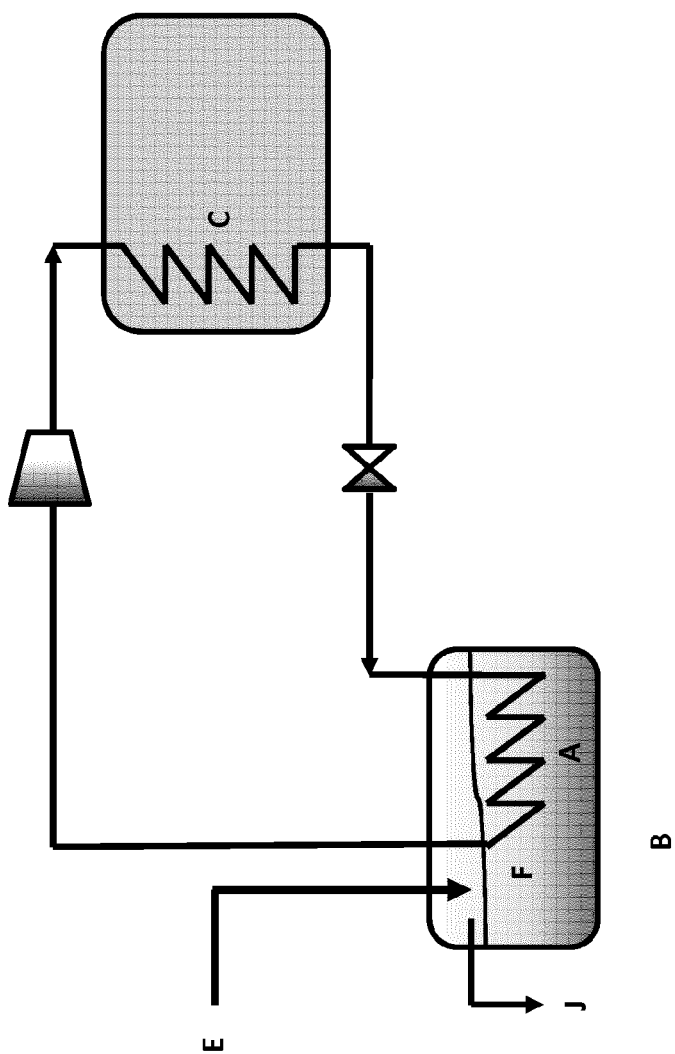
FIG. 1 illustrates an embodiment of a heat pump system in accordance with the present invention.

In a first embodiment in accordance with the present invention and as illustrated in FIG. 1, a heat pump system is provided comprising an heat-exchanger (A) extracting latent heat from liquid stored in a reservoir, thereby forming ice slurry (F), and means for delivering said heat to a heat consumer (C), characterized in that the heat pump system comprises random input of extrinsic liquid (E) into the reservoir (B) and means (J) for removing ice slurry stored in the reservoir outward the system In the context of the present invention, random input of extrinsic liquid may be input on regular or irregular, —depending on availability of the extrinsic liquid—, moments in time of any kind of extrinsic liquid, i.e. liquid brought into the reservoir from anywhere outside the heat pump system and containing a certain amount of thermal energy. Examples may be input of collected rainwater, domestic waste water, seawater, process water or fluids from any kind of manufacturing or industrial activity (inclusive food industry).

The system of the invention differs from the closed loop systems known in the art, in that the extrinsic liquid added to the reservoir originates from external sources, and not from a recirculation loop. In other words, the ice slurry removed from the reservoir is not a source of extrinsic liquid. For this reason, the size of the reservoir does not need to contain an amount of liquid sufficient for extracting latent heat during a whole winter period. The size of the reservoir can thus be reduced in comparison to closed loop systems.

The system of the invention differs from most of the open loop systems known in the art in that the supply of extrinsic liquid is random, i.e. the supply is not controlled as in open loop systems where ground water is pumped into the reservoir at a given rate. The supply thus depends on the availability of sources of extrinsic liquid. Therefore, the source of the extrinsic liquid is preferably not a single source but a plurality of sources, such as rainwater, domestic water, etc as indicated above. Another difference is that in most open loop systems existing today, no latent heat is extracted and no ice slurry is removed. In the system of the invention, ice slurry is removed outward the system.

Another difference with some open loop systems known in the art is that the ice slurry formed by the heat ex-changer stored in the reservoir, where a portion of it remains, while another portion is removed outward the system. The remaining portion extracts heat from the soil around the reservoir and/or from the inflow of extrinsic liquids. Consequently, the ice slurry will at least partially melt and becomes a heat source again containing latent heat, while the other portion of the stored ice slurry is removed outward the system and replaced by an equivalent volume of extrinsic liquid containing latent heat. This cyclic process of a semi open loop system results in a random at least partially recharging of the heat source.

The invention is thus also related to a method for supplying heat to a consumer comprising the steps of:
Supplying liquid to a reservoir,
Extracting latent heat from said liquid by a heat exchanger in heat-exchanging contact with the liquid of said reservoir, and transferring said heat to a refrigerant circulating in a loop comprising said heat exchanger, thereby forming an ice slurry,
Transferring said heat from the refrigerant to the consumer,
wherein
A random supply of extrinsic liquid is delivered to said reservoir,
Said ice slurry is stored in the reservoir,
a first portion of the stored ice slurry remains in the reservoir and a second portion of the stored ice slurry is removed from the reservoir and not recycled to the reservoir.

The extrinsic liquid used in the method, as well as the random supply are defined and exemplified as described above in relation to the system of the invention.

The ice slurry is stored in the reservoir either by remaining in the reservoir if the heat exchanger is immersed in the reservoir or by returning to it if the heat exchanger is located outside the reservoir.

The means for delivering heat to a heat consumer may comprise a refrigerant (not shown in the figures), a heat ex-changer (which preferably may be a condenser), a compressor, a pressure-lowering device such as an expansion valve and another heat-exchanger (which preferably may be an evaporator).

The refrigerant may be all kinds of refrigerants used in conventional heat pump, refrigerating, or air-conditioning systems, both for domestic or industrial use. The refrigerant may be a liquid, a mixture of different liquids (e.g. water/glycol mixture), a gas, a liquid evaporating into a gas and condensing again, a solution of solids into a liquid, etc.

The random input of extrinsic liquid provides additional thermal energy to the reservoir, which will be used for extracting latent heat from, and optionally for melting ice in the ice slurry remaining (i.e. being stored) in the reservoir.

Nearby the surface of the heat-exchanger the liquid will decrease in temperature towards its phase change temperature and will crystallize, resulting in formation of an ice slurry (for sake of easy reading "ice" is understood as the solid phase of any type of liquid used in accordance with the present invention). In contrast with ice layers sticking at the surface of the heat-exchanger, ice slurry can be removed or pumped away. As a result the performance of the heat ex-change process of the heat-exchanger is maintained and the ice slurry can be replaced by new liquid containing latent heat. In this way there is no need for a reservoir containing an amount of water sufficient for extracting latent heat during a whole winter period, and consequently the size of the reservoir may be reduced.

Input of extrinsic liquid and removal of ice slurry, may optionally be assisted by other means for avoiding ice layer formation and enhance ice slurry formation, such as means for keeping the liquid moving, e.g. a stirrer installed in the reservoir, a circulation circuit, or an overflow connection from the reservoir to a drain (see also FIG. 1).

In accordance with the present invention, the heat pump system comprises means for removing ice slurry outward the system. Ice slurry floating at the liquid surface can be removed by for example an overflow, optionally combined with for example a scraping mechanism installed in the reservoir.

The heat-exchanger may be immersed or may be located outside the reservoir.

In case being immersed, the heat-exchanger may be directly extracting latent heat from the reservoir to a second circuit.

Figure 2:
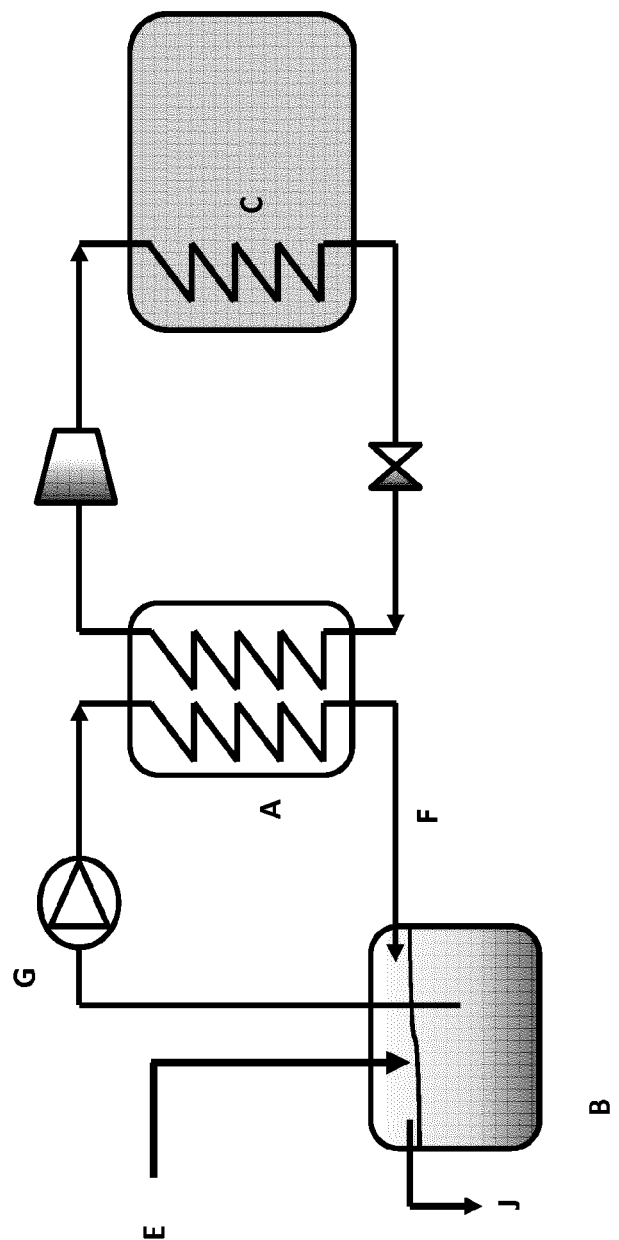
FIG. 2 illustrates an embodiment of a heat pump system in accordance with the present invention wherein the heat-exchanger is located outside the reservoir.

In case being located outside the reservoir as illustrated in FIG. 2, the heat-exchanger is part of both a second circuit and a first circuit, wherein the first circuit comprising a pump (G) for circulating the liquid stored in the reservoir through the heat-exchanger and wherein the heat-exchanger extracts latent heat from the first circuit towards the second circuit delivering heat to a heat consumer.

The heat-exchanger used in the present invention may be any type of heat-exchanger suitable for being immersed in a reservoir directly delivering latent heat from the reservoir to a second circuit, or any type of heat-exchanger suitable for transferring latent heat from a first circuit towards a second circuit delivering heat to a heat consumer.

Preferably, the heat-exchanger may be adapted for removing ice slurry, meaning that the heat-exchanger is adapted for forcing ice sticking at its surface again into the reservoir or into the first circuit. An example of such heat-exchanger may be a scraped surface exchanger, where a screw scrapes ice crystals formed on the inside surface of the heat exchanger producing ice slurry.

Preferably, the heat-exchanger may be an evaporator, which may contribute to increased performance of the heat pump system.

The liquid stored in the reservoir and the extrinsic liquid may comprise rain water, domestic waste water, seawater, manufacturing or industrial process water or fluids (waste or not waste), or combinations thereof. Consequently, the reservoir may be a rain water collector, a domestic waste water collector, a processing tank, cooling tanks, etc. Obviously, ground water and surface water may be also used but an advantage of the present invention is that thermal energy of rain water and/or waste waters can be used without being dependent on the local legislation with regards of the use of ground and surface waters.

In an embodiment of the present invention, the heat pump system may additionally comprise a cooling circuit.

Figure 3:
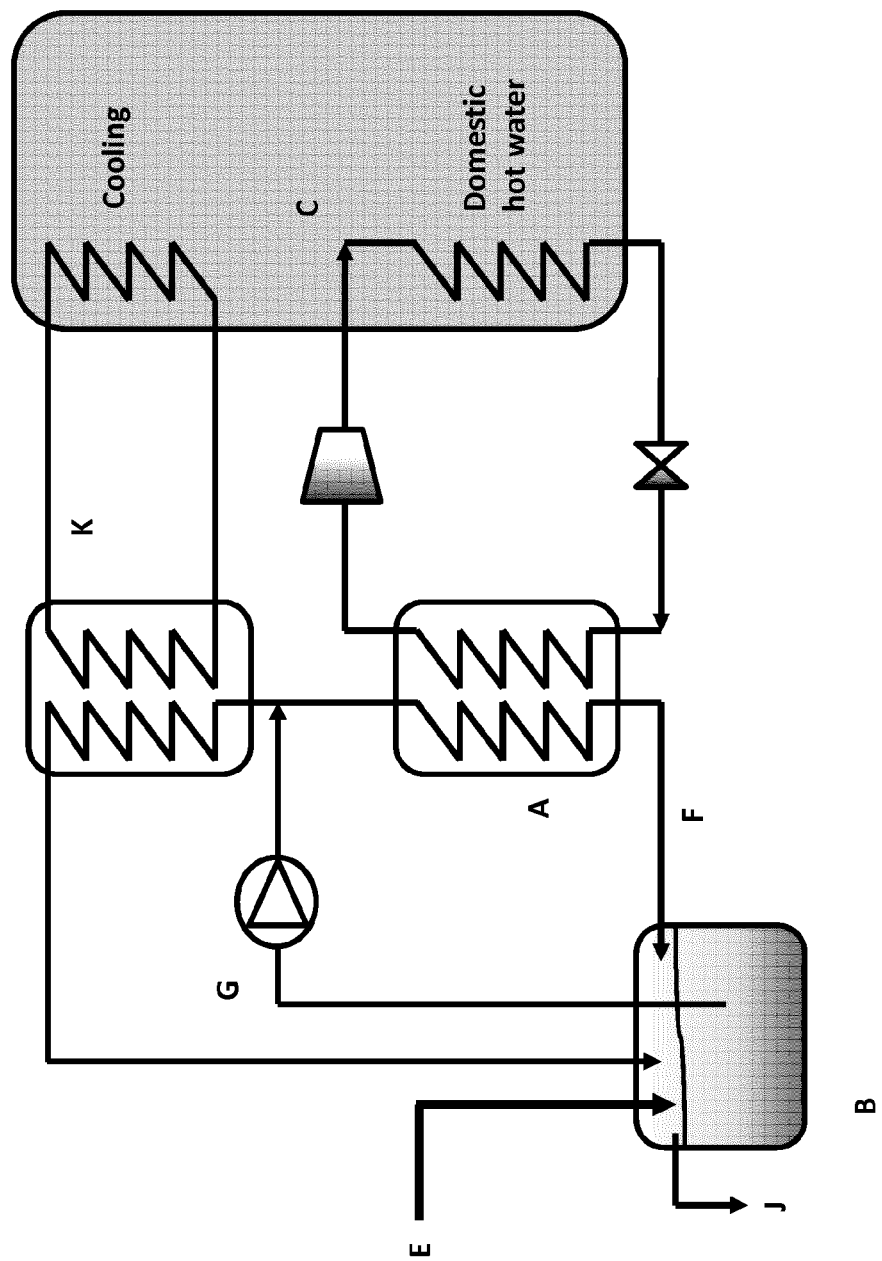
FIG. 3 illustrates an embodiment of a heat pump system in accordance with the present invention additionally comprising a cooling circuit adapted for delivering cold to a cold consumer by circulating liquid and/or ice slurry stored in the reservoir.

Such cooling circuit (K) may be adapted for delivering cold to a consumer by circulating liquid and/or ice slurry stored in the reservoir as illustrated in FIG. 3. For example in summer, when the temperature of the soil is lower than the ambient temperature, the liquid having soil temperature, may be circulated for cooling a consumer's premises, while keeping heating the consumer's domestic water.

Figure 4:
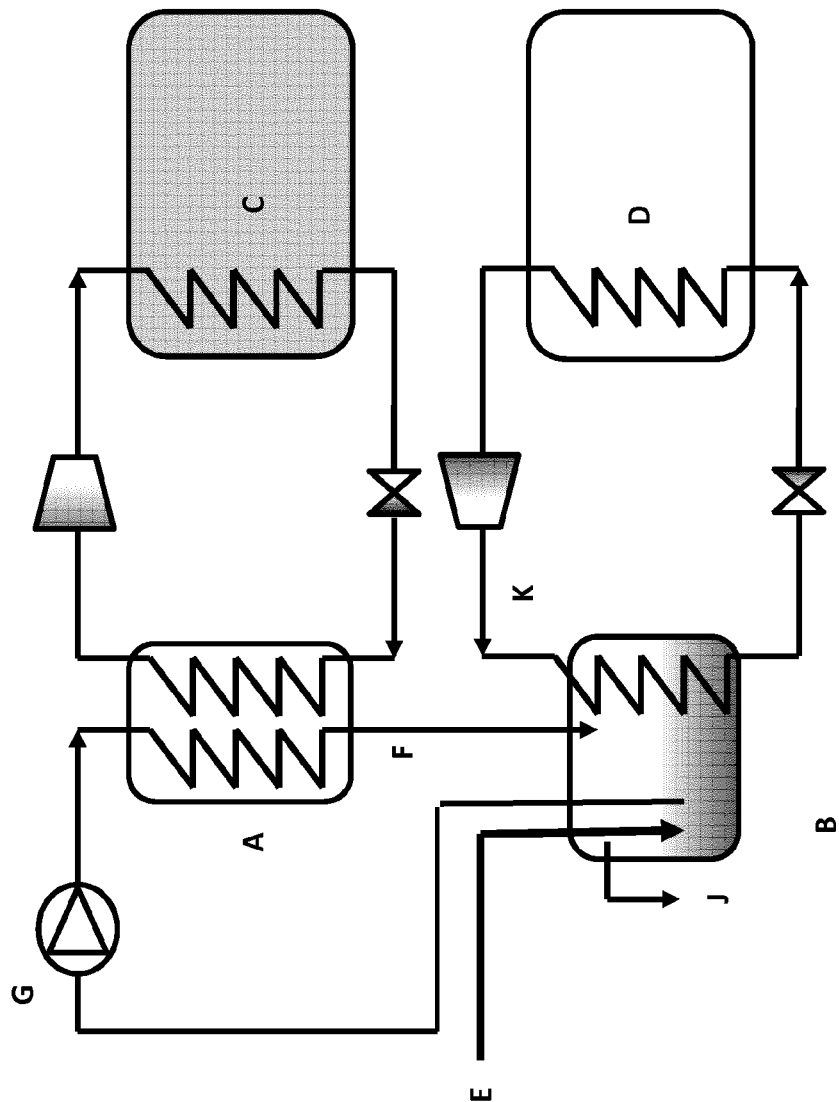
FIG. 4 illustrates an embodiment of a heat pump system in accordance with the present invention, additionally comprising a cooling circuit adapted for delivering cold to a cold consumer and delivering heat to the reservoir.
Figure 5:
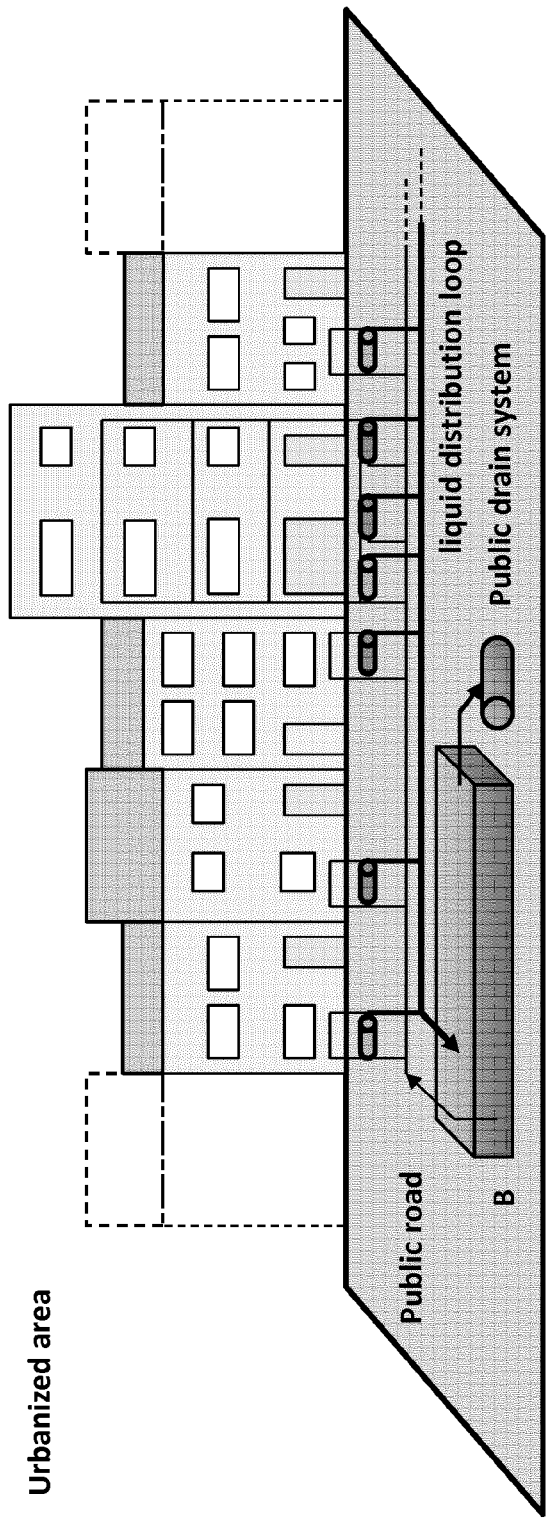
FIG. 5 illustrates an embodiment of a heat pump system in accordance with the present invention for use in an urbanized area.

As illustrated in FIG. 4, such cooling circuit (K) may be adapted not only for delivering cold to a cold consumer (D), but also for delivering heat to the reservoir. In this case a refrigerating or air-conditioning system may be implemented for extracting heat at a cold consumer's premises.

In a particular embodiment, the cold consumer and the heat consumer may be the same entity, for example a consumer extracting heat from its refrigerating and freezing rooms, storing the heat in the reservoir, and delivering at least part of it to rooms to be heated.

In accordance with the present invention, the heat pump system may comprise a plurality of heat-exchangers, a plurality of second circuits for delivering heat to a plurality of heat consumers, and a plurality of first circuits circulating liquid stored in a common reservoir. Optionally, the plurality of heat-exchangers may be installed at the premises of the plurality of heat consumers. For example each individual heat consumer may have an individual heat-exchanger installed (and a circulation pump) and appropriate tubing for extracting heat from a common reservoir (e.g. a common rain water collector beneath the road). This embodiment may be very advantageous in urbanized areas wherein lack of building space is a severe limitation for using heat pump heating.

Alternatively, also a plurality of first circuits circulating liquid stored in a plurality of reservoirs may be used. In case several types of liquid may not be mixed, it would be advantageous to store separately rain water, domestic waste water, or process water, etc. and to provide a respective extrinsic liquid input for each reservoir.

As explained already above, the reservoir or a number of the plurality of reservoirs may be incorporated in the soil, using, besides thermal energy from input of extrinsic liquid, also geothermal energy for heating the reservoir(s). Alternatively, they may be installed anywhere else optionally making use of any kind of waste heat sources or ambient heat for heating the reservoir(s).

Further, by controlling the circulation pump feeding the heat-exchanger, the heat generation can be regulated based on the demand or the electrical off-peak hours to run the heat pump system. In this case the reservoir(s) may be used for storing heat to be delivered during electrical off-peak hours.

EXAMPLE 1 illustrates the reduced reservoir size of a heat pump system in accordance with the present invention compared to conventional systems:

An average Belgian house of 150 m2, occupied by 4 residents, isolated conform the current local regulations, exposed to the average Belgian weather conditions requires a reservoir of approximately 20 000-25 000 liters to supply heat for heating the house and for generating domestic hot water. The reservoir is incorporated in the soil requiring a ground level surface of less than a parking place for 1 car.

EXAMPLE 2 illustrates the application of a heat pump system in accordance with the present invention in urbanized areas:

The rainwater pit to supply water for the heat pump can be used by several users. The rainwater must then be distributed by a rainwater distribution loop. The rainwater reservoir is installed under the asphalt of the public road and is integrated with the other utility supplies and drain systems. Since the surface to collect rainwater is an important parameter in the design and sizing of the rainwater pit, it is beneficial to use the surface of the public road combined with the surfaces of the roofs of the houses to collect as much as possible rainwater. The system becomes now a public utility system that is explored and maintained by for example a public or private held utility company. It makes the use of heat pumps feasible in densely populated areas, which is almost impossible with the traditional heat pump technology.

EXAMPLE 3 illustrates the application of a heat pump system in accordance with the present invention for industrial users:

A lot of industrial complexes have large parking spaces and many square meters of flat roofs which are ideal to collect rainwater feeding the rainwater reservoirs. Often these complexes have also retention pits to assure a controlled drain of rainwater preventing floods in case of heavy rainfall. These retention pits can be transformed to rainwater reservoir feeding heat pumps and become useful from an energy supply perspective.

In case the industrial activities are using cold rooms to store products as part of the supply chain or manufacturing process, the ice slurry can be used as cold source. The water-ice mixture in the rainwater reservoirs is not only suitable to supply latent heat for heating the building but it can also be used to supply cold for the cold rooms. In winter time this becomes a double win situation because the heat is extracted out of the cold room and is then used to heat the building. The rainwater acts as an energy carrier and an energy storage medium that compensates the gap between the supply and the demand of heat or cold which means less wasted energy.

The invention claimed is:

1. A heat pump system comprising:
   a reservoir for storing a liquid and ice slurry, the reservoir is a rain water collector, a domestic waste collector, a processing tank, or a cooling tank,
   a heat-exchanger separate from the reservoir and extracting latent heat from the liquid stored in the reservoir, thereby forming the ice slurry, the heat-exchanger located outside the reservoir and forming part of a circuit comprising a pump for circulating the liquid, a heat pump transferring the extracted heat (i) to a refrigerant circulating in a loop comprising the heat exchanger, and (ii) from the refrigerant to a heat consumer,
   wherein the heat pump system comprises an uncontrolled random input of extrinsic liquid into the reservoir, an overflow connection from the reservoir to a drain for removing a portion of the ice slurry stored in the reservoir outward the system, and an inlet for replacing the removed portion by the uncontrolled random input of an extrinsic liquid from one or more of a plurality of sources into the reservoir, the extrinsic liquid is rain water, domestic water, process water or fluid, or a combination thereof, originating from the one or more sources external to the system and not originating from the slurry removed from the reservoir.

2. The heat pump system according to claim 1, wherein the ice slurry is removed from an inside surface of the heat-exchanger into the reservoir or into the circuit for circulating the liquid.

3. The heat pump system according to claim 2, wherein the heat-exchanger is a scraped surface heat exchanger.

4. The heat pump system according to claim 2, wherein the heat-exchanger is an evaporator.

5. The heat pump system according to claim 2, additionally comprising a cooling circuit adapted for delivering cold fluid to a cold consumer and delivering heat to the reservoir.

6. The heat pump system according to claim 5, wherein the cooling circuit is a refrigerating or air-conditioning system.

7. The heat pump system according to claim 6, comprising a plurality of said heat-exchanger, a plurality of said heat pump for delivering heat to a plurality of said heat consumer, and a plurality of said circuit circulating liquid stored in the reservoir.

8. The heat pump system according to claim 7, wherein the plurality of said heat-exchanger are installed at each premises of the plurality of said heat consumer.

9. The heat pump system according to claim 7, wherein the plurality of said heat exchanger are installed at each premises of the plurality of said heat consumer.

10. The heat pump system according to claim 6, comprising a plurality of said circuit circulating liquid stored in a plurality of the reservoir.

11. The heat pump system according to claim 10, wherein each of the plurality of the reservoir separately stores rain water, domestic water, process water or process fluid.

12. The heat pump system according to claim 11 wherein at least one reservoir or a number of the plurality of the reservoir is incorporated in soil.

13. A method for supplying heat to a consumer comprising the steps of:
   supplying liquid to a reservoir, the reservoir is a rain water collector, a domestic waste collector, a processing tank, or a cooling tank,
   extracting latent heat from said liquid by a heat exchanger separate from the reservoir in heat-exchanging contact with the liquid of said reservoir, and transferring said heat to a refrigerant circulating in a loop comprising said heat exchanger, thereby forming an ice slurry,
   transferring said heat from the refrigerant to the consumer,
   wherein:
   storing the ice slurry in the reservoir such that it melts at least partially, and re-using it as a heat source again containing latent,
   the method further comprising:
   removing portion of the stored ice slurry from the reservoir outward the system and not recycled to the reservoir, and
   replacing the removed ice slurry by an uncontrolled random supply of extrinsic liquid randomly providing additional thermal energy to the reservoir for extracting latent heat from, the extrinsic liquid is rain water, domestic water, process water or fluid, or a combination thereof, originating from one or more of a plurality of sources external to the system and not originating from said ice slurry removed from the reservoir.

14. A heat pump system comprising:
   a reservoir for storing a liquid and ice slurry, the reservoir is a rain water collector, a domestic waste collector, a processing tank, or a cooling tank,
   a heat-exchanger separate from the reservoir and extracting latent heat from the liquid stored in the reservoir, thereby forming the ice slurry, the heat-exchanger located outside the reservoir and forming part of a circuit comprising:
   a pump for circulating the liquid, and
   a heat pump transferring the extracted heat (i) to a refrigerant circulating in a loop comprising the heat exchanger, and (ii) from the refrigerant to a heat consumer, a cooling circuit adapted for delivering cold fluid to a cold consumer and delivering heat to the reservoir, the cooling circuit is a refrigerating or air-conditioning system, a plurality of said heat exchanger, a plurality of said heat pump for delivering heat to a plurality of said heat consumer, and a plurality of said circuit circulating liquid stored in the reservoir, wherein the heat pump system comprises an uncontrolled random input of extrinsic liquid into the reservoir, an overflow connection from the reservoir to a drain for removing a portion of the ice slurry stored in the reservoir outward the system, and an inlet for replacing the removed portion by the uncontrolled random input of an extrinsic liquid, the extrinsic liquid comprises rain water, domestic water, process water or fluid, or a combination thereof from one or more of a plurality of sources into the reservoir, the extrinsic liquid is liquid originating from the one or more sources external to the system and not originating from the ice slurry removed from the reservoir, and the overflow connection removes ice slurry from the reservoir to the drain.

\* \* \* \* \*